F. RIVED.
ANGLE GAGE APPARATUS FOR USE IN MINING.
APPLICATION FILED AUG. 28, 1917.
1,307,987.
Patented June 24, 1919.
2 SHEETS—SHEET 1.
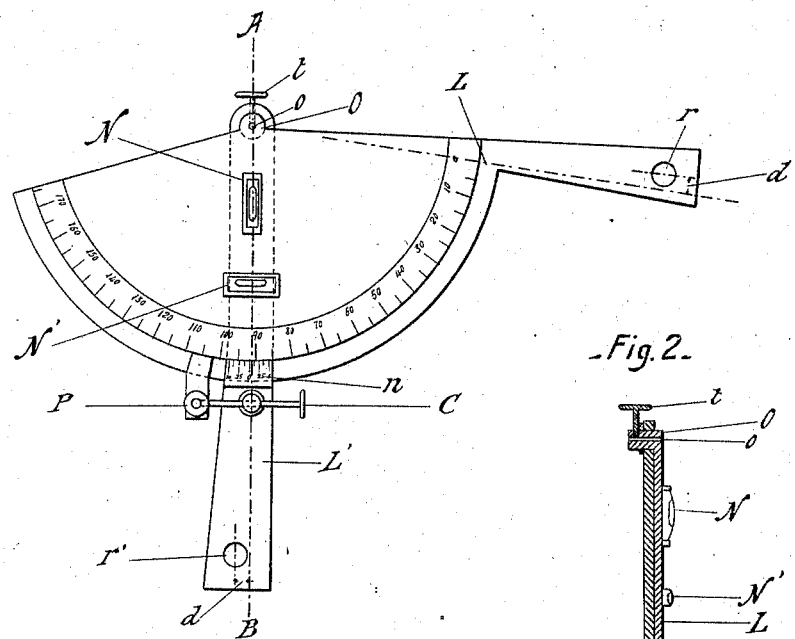
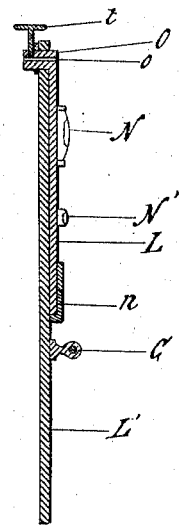
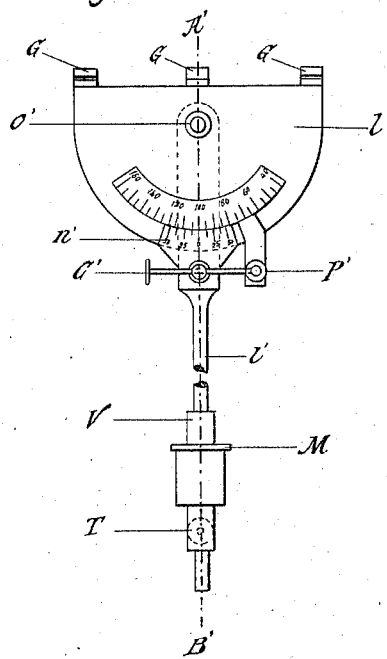
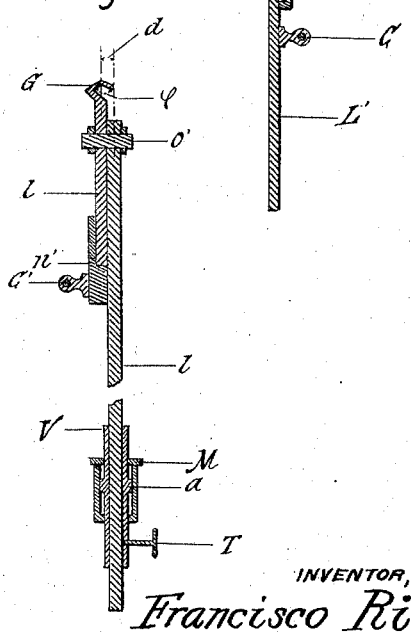
INVENTOR,
Francisco Rived,
by
ASSOCIATE ATTORNEY.

F. RIVED.
ANGLE GAGE APPARATUS FOR USE IN MINING.
APPLICATION FILED AUG. 28, 1917.

1,307,987.

Patented June 24, 1919.
2 SHEETS—SHEET 2.

INVENTOR,
Francisco Rived,
by
ASSOCIATE ATTORNEY

UNITED STATES PATENT OFFICE.

FRANCISCO RIVED, OF MADRID, SPAIN.

ANGLE-GAGE APPARATUS FOR USE IN MINING.

1,307,987.     Specification of Letters Patent.     Patented June 24, 1919.

Application filed August 28, 1917. Serial No. 188,657.

*To all whom it may concern:*

Be it known that I, FRANCISCO RIVED, a subject of the King of Spain, residing at Madrid, in the Kingdom of Spain, have invented certain new and useful Improvements in Angle-Gage Apparatus for Use in Mining, of which the following is the specification.

The difficulties which are encountered in connection with subterranean topography, are well known to all engineers. In certain places, the use of the theodolite is rendered either impossible or unsatisfactory for various reasons and the special stands required on which the instrument is fixed, are, under the conditions obtaining, difficult and cumbersome to set up and employ; while the use of the suspensory compass gives rise to serious errors in the horizontal angles, owing to the various perturbations of the magnetic needle.

My apparatus is intended to obviate these disadvantages and the same is shown in the accompanying drawings:—

Figure 1 is a plan view of the horizontal limb;

Fig. 2 is a section on line A B of Fig. 1;

Fig. 3 is a plan view of the vertical limb;

Fig. 4 is a section on the line A' B' of Fig. 3;

Figure 5:
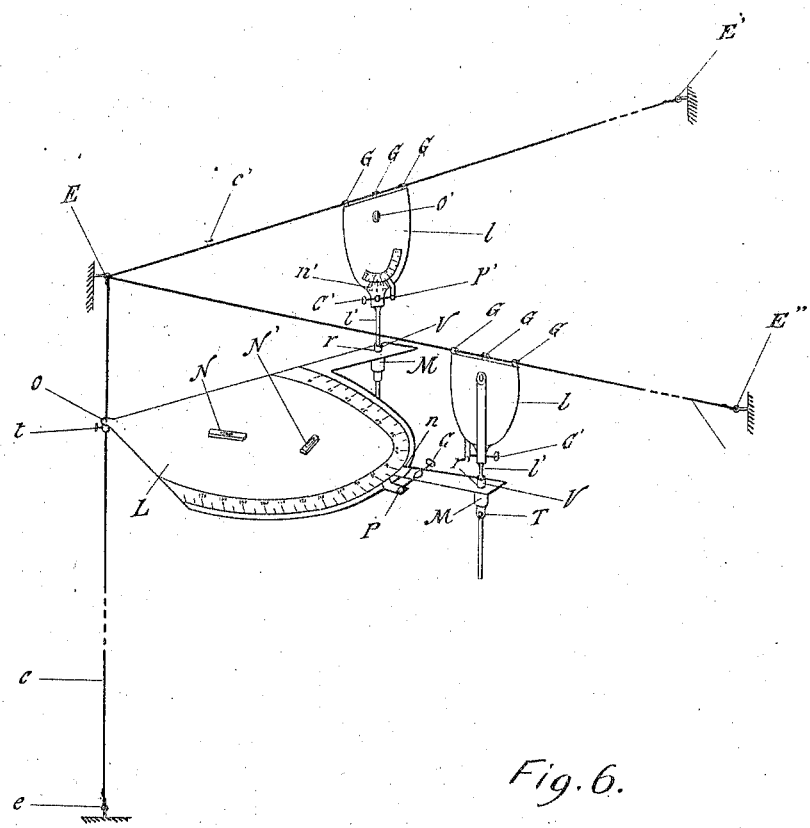
Fig. 5 is a perspective view of the apparatus set up in position.
Figure 6:
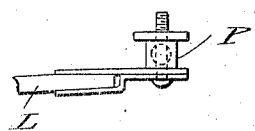
Fig. 6 is a detailed view of the means for clamping the scale in position.

The apparatus consists of three essential parts, namely, one horizontal, and two vertical limbs, the latter being duplicates in construction.

The horizontal limb (Figs. 1 and 2) consists of two parts, the one designated L which we may term fixed is in the form of a dial plate, the circumference being graduated to correspond to hundredths or the sixtieth part of the circle. The other or movable part is designated L' and carries a sliding scale $n$, movable adjacent the graduations and is in the form of a strip pivotally connected to the center of the dial plate at O.

The dial plate carries two levels N and N', placed at right angles to each other. The free end of the member L' as well as a radial extension of the dial plate are formed with apertures $r'$ and $r$ respectively, which are intended to receive the spindles V of the bracket supports M of the two vertical limbs which is described below. The movable part L' can be fixed to the fixed part L after rough adjustment by means of a clip, and a finer adjustment secured by means of the adjusting screw C. These adjusting devices may be of any well known or conventional type.

The dial plate has a small orifice $o$ passing through the center intended to receive a vertical cord, the purpose of which will be presently explained. The screw $t$ is provided to fix the apparatus to the said cord.

The vertical limbs (Figs. 3 and 4) each consists of a fixed part $l$ provided with hooks G, intended to suspend the apparatus from cords, the circumference of which is divided into equal parts, a movable rod $l'$, which latter carries the sliding scale $n'$, and a sliding collar M which can be fixed to the said rod by means of the set screw T. The movable rod $l'$ can be rotated around the center O' of the dial plate, and fixed relative to said plate by means of the clip P'; the finer adjustment being obtained by means of the coincident screw C'. The collar M is provided with a screw $a$ which permits fine adjustment of the collar necessary in order to level the apparatus.

The distance $d$ between the rods and the true lines of the strip L' and extension of the dial plate L is equal to the distance between the rods $l'$ and the hooks G.

The angle $e$ of the hooks G is very obtuse in order to rectify an error, as to which we will refer later.

The apparatus is used in the following manner:—

The tender hooks E, E' E'' . . . are driven into the side faces of the galleries, and between same are tightly stretched cords $c'$ and $c''$ from E to E' and from E to E'' . . . respectively in the same manner as if working with a suspended compass. By means of a plummet the intersection of the vertical as regards the hook E with the floor of the gallery can be arrived at, and at a so determined point, another tenter hook $e$ is driven. After having tied one end of a cord $c$ to the hook E, the other end is threaded through the orifice $o$ of the horizontal limb and fastened to the hook $e$. The apparatus should be put together beforehand, removing the collar M from the rods $l'$ of the vertical member and inserting the spindle V thereof into the orifices $r$ and $r'$ of the horizontal limb, and afterward introducing the rods l' into the collars fixing same therein by means of the associated set screws. The hooks G of the two vertical arms will be suspended from the cords c and c' after having loosened the set screws P and P' of the horizontal limbs.

The horizontal limb is moved along the length of the cord e finely adjusting the dial plate L by means of the screws a after having tightly fixed the screws T and t until the two levels show the plate L to be quite horizontal. When the set screws P and P' are tightened up by means of the coincidental screws, the cords c' and c'' will be found to be placed exactly in the apex of the angle e of the hooks G.

Then there is nothing further to do but to read off by the help of the sliding scale and with a hand reading glass, the horizontal angle in the limb L and the vertical angles on the limbs l. The first angle will be the horizontal projection of the angle at E which is formed by the cords c' and c'', and the vertical angles will be those that the inclinations of the cords c' and c'' measure with the horizontal. After that, the measure is taken of the longitudes c' and c'' and the height of the tenter hooks E, E' and E'' . . . above the floor of the gallery, repeating the operation at as many points as may be necessary (E, E'' . . .) thus obtaining all the exact elements required to draw up the plan and arrive at the divergencies in the level.

The three errors which may be committed in working with this apparatus are:—

1. *Error of station.*—This error is practically nil if care is taken in determining the intersection of the vertical at the hook E with the floor of the galley, because even in determining this point should a slight error occur, this discrepancy becomes enormously reduced by reason of the apparatus being stationed nearer the hook E than to the floor.

2. *Errors in the horizontal angles arising from the horizontal deflection of the cords.*—It is impossible to commit this error inasmuch as the angle e of the hooks is very obtuse especially if the precaution is taken of greasing these hooks on their inner surfaces, while the apparatus does not maintain the position necessary to read off the angles, the hooks will slip above the cords, but nothing will cause them to deflect in the horizontal sense.

3. *Errors in the vertical angles proceeding from any vertical deflection of the cords.*—This error is committed when taking the vertical angle of the cord solely at one of its extremities E, inasmuch as the apparatus has a certain specific weight. If however, the vertical angle is taken from the other extremity E' the same error will be repeated but in a contrary sense. That is to say, an excess in the first case, a deficiency in the second and vice versa, but by taking the arithmetical average of the two readings, the error will have been annulled.

I am not concerned in explaining the necessary mathematical problem work entailed, except as would be needed if conducting the operations with a mining compass.

As can be seen, my new mining "goniometer" combines the great facility of operation obtained by means of a suspensory compass and the great precision and exactitude obtained with the theodolite, both being qualities necessary for these operations and which have not hitherto been obtained in a single apparatus of this kind.

Having now particularly described the nature of my said invention and in what manner the same is to be performed, I declare that what I claim is:—

1. A device of the character described including a dial plate having an opening to receive a vertical cord, means for fixing the plate to the cord, and means for suspending the dial plate from points remote from the opening.

2. A device of the character described including a dial plate having an opening to receive a vertical cord, means for fixing the plate to the cord, an arm pivotally connected to the dial plate at the opening, and means for supporting a corner of the dial plate, and the free terminal of the arms.

3. A device of the character described including a dial plate having an opening to receive a cord, means for securing the dial plate to the cord, a radial extension on said dial plate, an arm pivotally connected to the plate for movement, and means for suspending the dial plate from the terminals of the extension and said arm.

4. A device of the character described including a dial plate having an opening to receive a vertical cord, means for fixing the dial plate to the cord, the periphery of said dial plate being graduated, a radial extension on said dial plate, an arm pivotally connected to the dial plate, a vernier plate on said arm for movement adjacent the graduations, means for fixing the arm to the plate, and means for suspending the dial plate from the terminals of the extension and said arm.

5. In a device of the character described, a dial plate, means for suspending the same including a pair of members each including a member plate, means on the member plates to suspend the same from a horizontal cord, and arms pivotally connected on the member plates to depend to support the dial plate.

6. In a device of the character described, a dial plate, means for supporting the same including a pair of vertical members each including a graduated member plate, means on said member plate to suspend the same from horizontal cords, a rod pivotally connected to each member plate to depend from the same, and means vertically adjustable on each rod to support the dial plate.

7. In a device of the character described, a dial plate, for horizontal positioning, means for supporting the same, including a pair of vertical members, each member including a vertically disposed graduated plate, hooked members on the upper edge of each plate to suspend the same from a horizontal cord, a rod pivotally connected to each plate to depend therefrom, means for fixing each rod to its plate subsequent to pivotal adjustment of the rod, and vertically movable means on each rod and supporting said dial plate.

8. A device of the character described including a dial plate for positioning in a horizontal plane, and having an opening to receive a vertical cord, means for fixing the dial plate to the cord, leveling devices supported upon the dial plate, said dial plate having peripheral graduations, a radial extension on said dial plate having a terminal aperture, an arm pivotally connected to the center of the dial plate for movement thereabout, a vernier scale carried by the arm for movement adjacent the graduations of the dial plate, means for fixing the plates to the dial plates subsequent to pivotal adjustment of the arm, the free end of the arm having an aperture, a pair of suspending devices each including a vertical semi-circular plate, hook members along the diametrical edge of each semi-circular plate, rods depending from the corner of each of said semi-circular plates, to enter at their lower ends the apertures of the dial plate extension and arm, means vertically adjustable on the rods to support the dial plate and to adjust the same vertically, and means for fixing each rod to its plate subsequent to adjustment.

In testimony whereof I affix my signature in presence of two witnesses.

FRANCISCO RIVED.

Witnesses:
J. GOMER HEREDIA,
T. R. DE SALVOR.

Copies of this patent may be obtained for five cents each, by addressing the "Commissioner of Patents, Washington, D. C."